US009341526B2

(12) United States Patent
Bass et al.

(10) Patent No.: US 9,341,526 B2
(45) Date of Patent: May 17, 2016

(54) SYSTEM FOR SPEED-BASED POWER CALCULATION

(71) Applicant: Saris Cycling Group, Inc., Madison, WI (US)

(72) Inventors: Benjamin R. Bass, Madison, WI (US); Edward M. Watson, Madison, WI (US); Jesse Bartholomew, Madison, WI (US); Jeffery T. Iverson, Madison, WI (US)

(73) Assignee: Saris Cycling Group, Inc., Madison, WI (US)

( * ) Notice: Subject to any disclaimer, the term of this patent is extended or adjusted under 35 U.S.C. 154(b) by 104 days.

(21) Appl. No.: 14/227,128

(22) Filed: Mar. 27, 2014

(65) Prior Publication Data

US 2014/0297009 A1    Oct. 2, 2014

Related U.S. Application Data

(60) Provisional application No. 61/806,993, filed on Apr. 1, 2013.

(51) Int. Cl.
*G01L 3/24* (2006.01)
*B62J 99/00* (2009.01)

(52) U.S. Cl.
CPC .............. *G01L 3/242* (2013.01); *B62J 99/00* (2013.01); *B62J 2099/0013* (2013.01); *B62K 2207/00* (2013.01)

(58) Field of Classification Search
None
See application file for complete search history.

(56) References Cited

U.S. PATENT DOCUMENTS

| | | | |
|---|---|---|---|
| 7,377,180 B2 | 5/2008 | Cunningham | |
| 7,387,029 B2 | 6/2008 | Cunningham | |
| 7,833,135 B2 | 11/2010 | Radow et al. | |
| 7,862,476 B2 | 1/2011 | Blau et al. | |
| 7,976,434 B2 | 7/2011 | Radow et al. | |
| 8,011,242 B2 | 9/2011 | O'Neill et al. | |
| 2006/0095191 A1 | 5/2006 | Lin | |
| 2006/0248965 A1* | 11/2006 | Wyatt | A61B 5/0002 73/862.391 |
| 2007/0068273 A1* | 3/2007 | Cunningham | G01L 3/247 73/781 |
| 2008/0071436 A1* | 3/2008 | Dube | B62M 6/45 701/22 |
| 2010/0198453 A1 | 8/2010 | Dorogusker et al. | |
| 2011/0118086 A1* | 5/2011 | Radow | A63B 21/00196 482/5 |
| 2011/0185803 A1 | 8/2011 | Demajistre et al. | |
| 2013/0289932 A1* | 10/2013 | Baechler | A61B 5/0002 702/141 |
| 2014/0062351 A1* | 3/2014 | Spelta | B60L 11/1801 318/139 |

FOREIGN PATENT DOCUMENTS

| | | | |
|---|---|---|---|
| EP | 1154253 | 11/2001 | |
| JP | 2004025913 | * 1/2004 | B62M 6/45 |
| NL | 2001323 | 8/2009 | |
| WO | 2010000369 | 1/2010 | |

OTHER PUBLICATIONS

EP No. 14162402.3—Communication dated Oct. 29, 2014 and Search Report.

* cited by examiner

*Primary Examiner* — Jason Yen
(74) *Attorney, Agent, or Firm* — Boyle Fredrickson, S.C.

(57) ABSTRACT

A system for determining power expended by a bicyclist while riding a bicycle based on speed measurements or sensed-speed values. The system includes a sensing device arranged for detecting a speed-related value of the bicycle and a processor that communicates with the sensing device. The processor is configured to determine a change in the speed-related value and to determine a power value based on the change in the speed-related value.

9 Claims, 7 Drawing Sheets

SYSTEM FOR SPEED-BASED POWER CALCULATION

CROSS-REFERENCE TO RELATED APPLICATION

This application claims priority from U.S. Provisional Patent Application No. 61/806,993, which was filed on Apr. 1, 2013, the subject matter of which is incorporated by reference in its entirety.

BACKGROUND OF THE INVENTION

1. Field of the Invention

The present invention relates to bicycle power-sensing systems and, more particularly, to a bicycle power-sensing system that determines power based on a speed value(s).

2. Discussion of the Related Art

Bicycle power-sensing systems are known. Power meters are power-sensing systems that can sense a bicyclist's expended power directly at the bicycle, while moving. Some trainers used for supporting bicycles for stationary training with resistance units can sense power expended by a bicyclist. These known power-sensing systems typically require expensive sensors like strain gauges or other torque sensors. Many known power-sensing systems require a coast-down test to account for rolling resistance before every ride and some known power-sensing systems use speed-power lookup tables that can be at least somewhat inaccurate at times.

SUMMARY OF THE INVENTION

The present invention is directed to a system for speed-based power calculation that can be used to indirectly determine power of a bicyclist while riding a bicycle. This may be done by using speed measurements or sensed speed values to determine power expended by a bicyclist in view of values of system inertia and resistive forces.

According to one aspect of the invention, determining power may be done by evaluating energy lost relative to total resistance in the system so as to calculate how much power must be produced to maintain a current speed. Evaluating changes in speed, such as deceleration, during the dead spot measurement periods allows for calculating energy lost as a function of energy dissipation during the dead spot measurement periods, without power input from the bicyclist to the bicycle. This allows for a system that can determine power using sensors that can detect speed-related performance characteristics of the bicycle, without requiring expensive sensors like strain gauges or other torque sensors.

According to another aspect of the invention, an expended power value may be determined based on a speed value that is evaluated with respect to a known inertia value or accurately approximated inertia value of the system. This allows calculation of power by evaluating such system inertia in view of changes of speed in view of counteracting forces. For on-road implementations having the bicycle power-sensing system arranged at the bicycle, an on-road inertia value may be a sum of system inertia in the bicycle and the bicyclist, which may correspond to a total weight of the bicyclist and the bicycle. For stationary implementations having the bicycle power-sensing system arranged at a trainer that supports the bicycle for stationary training, an on-trainer inertia value may be a sum of system inertia in rotating components of or cooperating with the trainer. These rotating components may include a roller of the resistance unit, the bicycle rear wheel, a flywheel of the resistance unit, and bearings of the resistance unit. The changes in speed may be deceleration and the counteracting forces may be summed forces counteracting forward movement or rotation of various rotating components, or a resistance value(s). For on-road implementations having the bicycle power-sensing system arranged at the bicycle, an on-road resistance value may be a sum of resistance components from acceleration, hills, rolling resistance, and aerodynamic drag. For stationary implementations having the bicycle power-sensing system arranged at a trainer that supports the bicycle for stationary training, an on-trainer resistance value may be a sum of resistance components from the brake components of the trainer, acceleration, frictional losses between the rear wheel of the bicycle and drum or roller of the resistance unit, and frictional losses within bearings and between engaging portions of bearings and an axle of the resistance unit. This allows for a system that can determine power using speed-related performance characteristics of the bicycle, without using, and more accurate than, speed-power lookup tables.

According to another aspect of the invention, determination of instantaneous or near instantaneous deceleration at a dead spot in a pedal stroke due to forces countering forward movement or forces countering maintenance of rotational speed allows for determining an accurate power value despite resistive forces that may change dynamically throughout a ride or training session, while using speed-related values. Deceleration may be continuously measured in every pedal stroke for evaluating instantaneous or near instantaneous deceleration at a dead spot in a pedal stroke. Determination of instantaneous or near instantaneous deceleration at the dead spot in the pedal stroke due to forces countering forward movement or forces countering maintenance of rotational speed allows for determining an accurate power value despite resistive forces that may change dynamically throughout a ride or training session, while using speed-related values. Such determination can be used to evaluate how much power would be required to maintain current speed, yielding a value that corresponds to expended power by the bicyclist. A total power value or bicyclist expended power value may be derived from a steady speed power determined by the deceleration in the dead spot combined with a macro scale acceleration/deceleration of the system. This allows for a system that can determine power based on signals from sensors that can detect speed-related performance characteristics of the bicycle.

According to another aspect of the invention, a change in a speed-related value corresponding to a change in at least one of a linear speed of a bicycle, a rotational speed of a rotating component of the bicycle, and a rotational speed of a rotating component of a resistance unit for resisting a pedaling effort of a bicyclist pedaling the bicycle is determined. A power value is determined based at least in part on the determined change in the speed-related value. A dead spot occurrence in which a minimum power is applied by the bicyclist to the bicycle during a pedal stroke may be determined, and the change in the speed-related value for the dead spot occurrence may be determined. The power value may be determined at least in part by evaluating the change in speed-related value for the dead spot occurrence and an inertia value of the bicycle. This allows for determining a power value using data from sensors that can detect speed-related performance characteristics of the bicycle.

According to another aspect of the invention, a system is provided for determining power of a bicyclist while riding a bicycle. The bicycle includes a frame and a rotating component rotatably coupled to the frame. A sensing device is arranged for detecting a speed-related value of the bicycle. A processor communicates with the sensing device and is configured to determine a change in the speed-related value and to determine a power value based on the change in the speed-related value. This allows the system to be small, compact, and lightweight to facilitate retrofitting to existing bicycle or bicycle trainer components, while incorporating relatively low-cost sensing devices.

According to another aspect of the invention, the sensing device may be arranged for sensing a rotational speed of the rotating component. The speed-related value corresponds to the sensed rotational speed of the rotating component. The change in the speed-related value corresponds to a change in the rotational speed of the rotating component. The sensing device may be arranged at least one of a front wheel, a rear wheel, forks, and a crank assembly of the bicycle for determining the change in the speed-related value of the at least one of the front wheel, the rear wheel, the forks, and the crank assembly of the bicycle. A trainer frame may support the bicycle in a generally stationary position while a bicyclist exerts a pedaling effort to rotate a driven wheel of the bicycle and a resistance unit that is supported by the trainer frame, and includes a roller driven to rotate by the driven wheel of the bicycle for resisting the pedaling effort of the bicyclist. The sensing device may be arranged for sensing rotational speed of the roller, and the change in the speed-related value corresponds to a change in rotational speed of the roller of the resistance unit. By determining power from sensed speed-related characteristics, a coast-down test is not required to account for rolling resistance, whereby power can be accurately determined, despite temperature fluctuations and/or changes in tire pressure.

According to another aspect of the invention, the sensing device may be an angular accelerometer for measuring an angular acceleration and/or deceleration of the rotating component. The processor may determine the change in the speed-related value corresponding to an occurrence of a dead spot in a pedal stroke in which a minimum power is applied by a bicyclist to the bicycle during the pedal stroke. The processor may determine an energy-lost value and evaluate the change in the speed-related value with respect to the energy-lost value to determine the power value. The energy-lost value may correspond to a deceleration during the dead spot in the pedal stroke. The energy-lost value may be determined based at least in part on an inertia value of the system. The inertia value may be a sum inertia value defined by summing multiple inertia component values of the system. The inertia component values of the system may include at least one of an inertia value of the bicycle, an inertia value of the bicyclist, and respective inertia values of multiple rotating components of the system. This allows the system to determine power based on detected or measured speed-related performance characteristics of the bicycle.

According to another aspect of the invention, the sensing device may be a linear accelerometer for measuring an acceleration and/or deceleration of the bicycle, and the change in the speed-related value corresponds to acceleration and/or deceleration of the bicycle. A speed sensor may be arranged for sensing the speed of the bicycle. The processor may communicate with the linear accelerometer and the speed sensor and determine a maximum acceleration or deceleration value that corresponds to a dead spot of a pedal stroke in which a minimum power is applied by a bicyclist to the bicycle during the pedal stroke. The power value may be determined based on the speed and deceleration values at the dead spot. This allows the system to determine power based on a detected acceleration and/or deceleration of the bicycle.

According to another aspect of the invention, for on-road implementations having the bicycle power-sensing system arranged at the bicycle for on road use, power related to macro scale accelerations and/or decelerations may be accounted for based on a macro scale speed measurement, rather than the dead-spot deceleration measurement. If the power due to these macro scale accelerations/decelerations account for less than about 5% of the power spent during a ride, then it may be ignored in such evaluation; however it is understood that it could be included which may allow for obtaining maximum accuracy. This allows for determining power primarily in light of macro scale speed measurement(s).

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Specific embodiments of the present invention will be described by the following non-limiting examples which will serve to illustrate various features of the invention. With reference to the drawing figures in which like reference numerals designate like parts throughout the disclosure, representative embodiments of the present invention are shown as system 5A in FIG. 1 and system 5B in FIG. 2 which are configured to calculate power of a bicyclist based on speed values. It is understood that the speed values may include various speed-related values, such as values that are functions of speed or components of speed, for example, changes in speed and/or rates of changes in speed, as explained in greater detail elsewhere herein.

Figure 1:
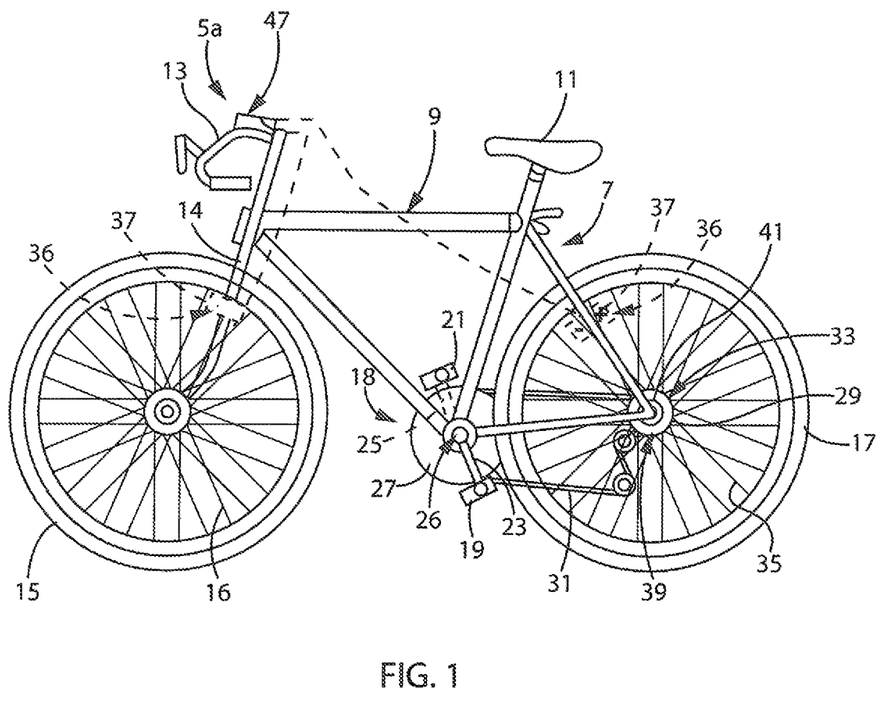
FIG. 1 is a partially schematic side elevation view of a bicycle incorporating a system for speed-based power calculation in accordance with the present invention.

Referring now to FIG. 1, the system 5A is arranged on a bicycle 7 that has a frame 9 that supports a seat 11, handlebars 13, and front forks 14 that support a front wheel 15 that may include spokes 16. The frame 9 also supports a back wheel 17 and a drivetrain 18 that transfers power from the bicyclist to the back wheel 17 for propelling bicycle 7. Drivetrain 18 includes a left pedal 19 and a right pedal 21 that are connected to left and right crank arms 23, 25, respectively, of a crank assembly 26. The crank arms 23, 25 are arranged to rotate a crank chain ring 27 that is coupled to a driven sprocket 29, which is typically one of several sprockets in a stack or cone of differently-sized sprockets, by a chain 31 or belt (not shown). The driven sprocket 29 is operably coupled to a hub assembly 33 that carries and rotates the back wheel 17 by way of spokes 35 or a solid disc (not shown).

Still referring to FIG. 1, a measuring device shown as sensing device 36 may be arranged upon the bicycle 7 for determining performance characteristics of the bicycle 7 or rotating components of the bicycle 7, such as speed, acceleration, and/or deceleration, as explained in greater detail elsewhere herein. The sensing device 36 may include a sensor, shown here as a sensor(s) 37 that is arranged upon the bicycle 7 for sensing or otherwise determining a speed, acceleration, and/or deceleration of a rotating component of the bicycle 7. In one embodiment, the sensor(s) 37 may be arranged on the front forks 14 and/or the front wheel 15 for sensing speed of the front wheel 15, which may include measuring rotational speed or velocity of the front wheel 15 as a rotating component. In another embodiment, the sensor(s) 37 may be arranged toward the back of the frame 9 for sensing speed of the back wheel 17, which may include measuring rotational speed or velocity of the back wheel 17 as a rotating component. It is understood that the sensor 37 may be arranged at a different location upon the bicycle 7 for sensing speed, acceleration, and/or deceleration of a different portion of the front or back wheel 15, 17, or a speed(s) of a different rotating component, such as a rotating component within the crank assembly 26. In another embodiment, the sensor(s) 37 is arranged for sensing the speed such as linear speed, acceleration, or deceleration of the overall system or the bicycle 7 itself and the bicyclist, instead of a rotating component of the bicycle 7.

Figure 2:
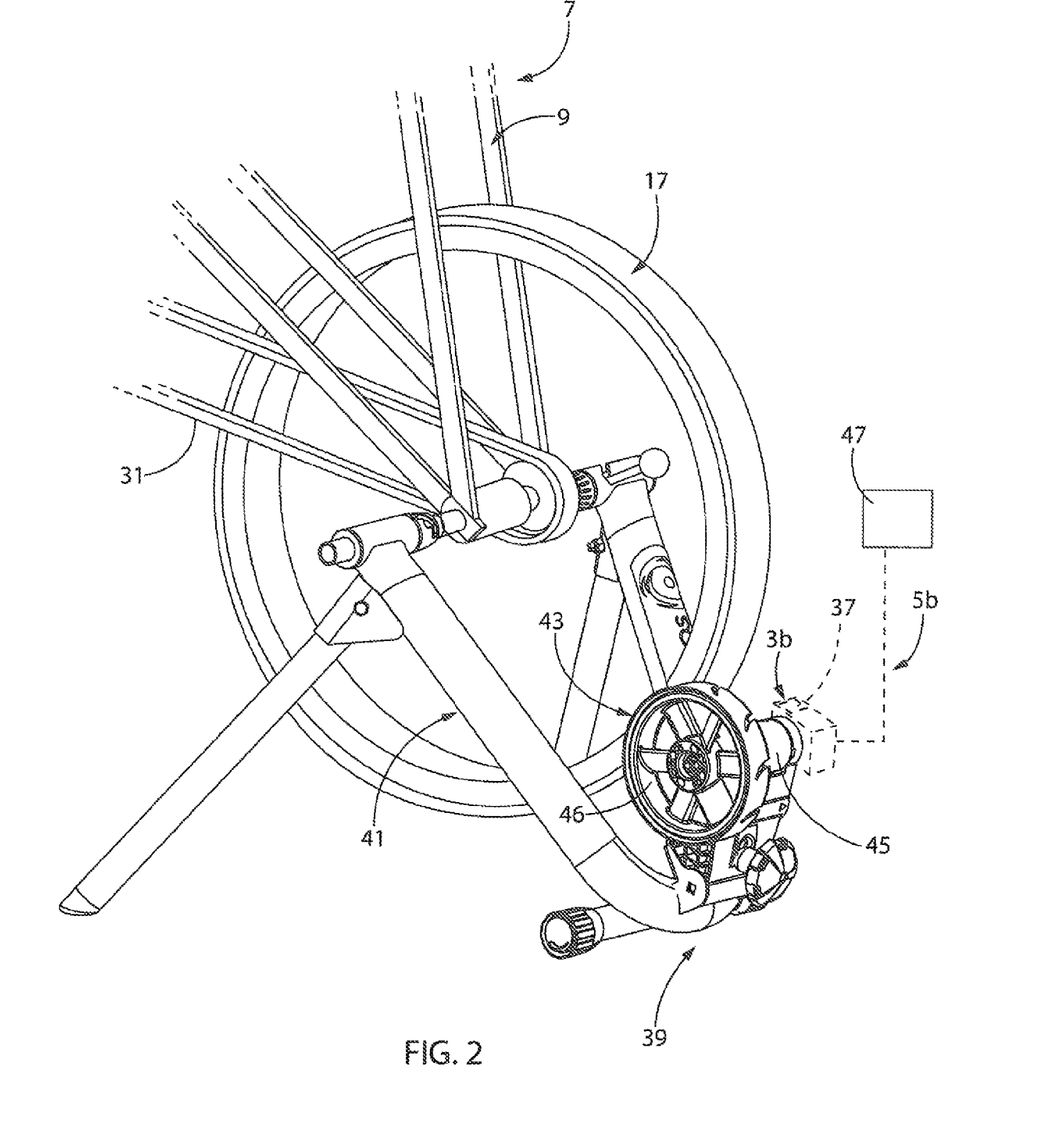
FIG. 2 is a partially schematic isometric view of a trainer incorporating a variant of the speed-based power calculation system shown in FIG. 1.

Referring now to FIG. 2, in another embodiment, the system 5B is arranged in a trainer 39 having a frame 41 that supports the driven rear wheel 17 of the bicycle 7 and a resistance unit 43 that cooperates with the driven rear wheel 17 of the bicycle 7 so as to resist the pedaling effort of the bicyclist in a known way. The sensor 37 may be supported by the trainer frame 41 and arranged with respect to a rotating component of the resistance unit 43 for sensing speed of such rotating component. In one embodiment, the sensor 37 is arranged relative to a drum or roller 45 that is rotated along with a flywheel 46 by the driven rear wheel 17 of the bicycle 7 for sensing speed of the roller 45 which may include measuring rotational speed or velocity of the roller 45 as a rotating component. It is understood that the resistance unit 43 may be incorporated into the bicycle 7 itself, such as by arranging a suitable resistance unit in place of the driven rear wheel 17 as a directly-driven trainer and may include the sensor(s) 37 arranged at a flywheel or a driven wheel-type resistance unit of such directly-driven trainer.

Referring now to FIGS. 1 and 2, in one embodiment, the sensor 37 is a speed sensor. The sensor 37 may take high-frequency speed measurements of the rotating component that the sensor 37 is evaluating. This may include taking multiple speed measurements per second, In one embodiment, a speed measurement is taken every $1/20$ of a second or $1/100$ of a second, or more frequently. This allows for a high precision and high-frequency speed measurement to determine velocity or changes in velocity. Even at a very high cadence of, for example, 140 rotations per minute (rpm), every pedal stroke lasts about $214/1000$ of a second, which is substantially longer than the $1/20$ or $1/100$ of a second during which speed measurement can be taken. This allows multiple measurements to be taken for the measurement period of the measurement, or allows for a measurement period of a relatively longer duration, which still may be substantially shorter than the about $214/1000$ of a second of the pedal stroke in the 140 RPM example. It can be appreciated that even more or longer measurements can be made at more normal lower cadences, such as in the range of 80 to 105 rpm, Still referring to FIGS. 1 and 2, in one embodiment, the sensor 37 is a rotary-speed sensor, which may be optical-based or magnetic-based, such as a hall effect-type sensor. In another embodiment, the sensor 37 is an accelerometer such as a linear accelerometer that can measure acceleration or deceleration of the bicycle 7, itself, and the bicyclist (FIG. 1). The accelerometer may allow for fore/aft acceleration and/or deceleration measurements and can be combined with a speed sensor that measures speed on a macro scale to determine large scale accelerations/decelerations. In another embodiment, the sensor 37 may be an angular accelerometer that can measure angular acceleration and/or deceleration of a rotating component of the bicycle 7 or trainer 39 and may be combined with a speed sensor that measures speed on a macro scale to determine current speed and large scale accelerations/decelerations. Signals corresponding to speed, acceleration, and/or deceleration measurements are transmitted from sensor(s) 37 or sensing device 36 to an electronics module shown as a computer 47 that evaluates data corresponding to speed values from the measurements for determining a power value representing power outputted by the bicyclist.

Figure 3:
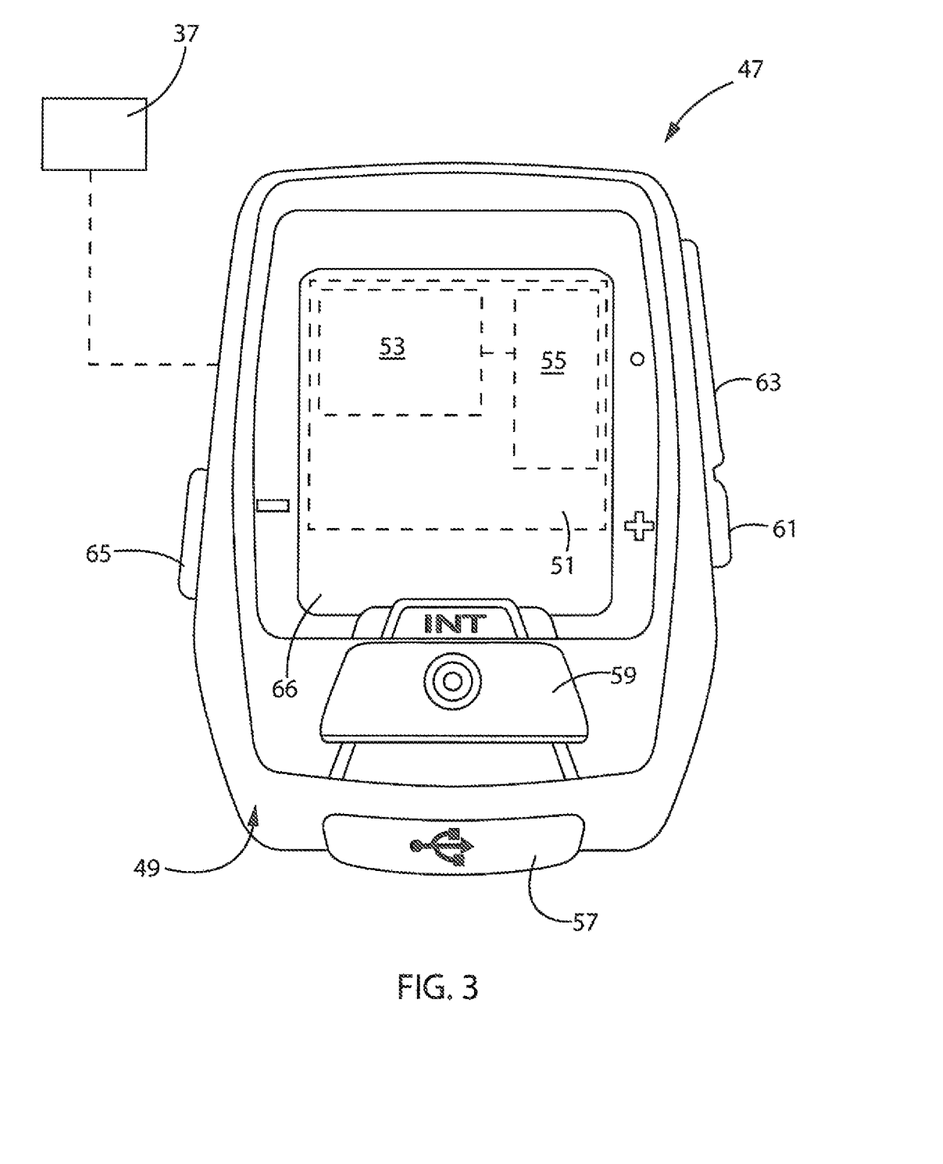
FIG. 3 is a partially top plan view of the cycle computer incorporated into the speed-based power calculation system of FIG. I.

Referring now to FIG. 3, the computer 47 may representatively be a JOULE or JOULE GPS cycling computer available from CycleOps POWER or any other type of bicycle computer or suitable processing device. Computer 47 includes a housing 49 that holds circuitry 51 which includes a processor 53 that is configured to execute particular applications that operate in accordance with a computer software program that is stored on memory 55. The memory 55 can also store data that corresponds to information that is displayed, explained in greater detail elsewhere herein, or data that corresponds to the performance of the bicyclist or bicycle 7 during a riding session(s) so as to create a database of historical ride information. An antenna or port 57 is operably connected to the circuitry 51 for connecting the computer 47 to another computer or other auxiliary device, which can allow for controlling and updating the computer 47. Buttons 59, 61, 63, 65 allow the bicyclist to input commands or information and navigate through menus that are displayed on a screen 66 and thus control the computer 47. In one embodiment, the speed, acceleration, and/or deceleration measurement(s) may be evaluated internally in the sensing device 36 and power data may be transmitted to another device such as the computer 47 or some other display or secondary device, such as a smart phone. In another embodiment, the sensing device 36 may be incorporated into the computer 47 or secondary device, such as a smart phone for evaluating, for example, deceleration values during certain portions of a pedal stroke, such as a dead spot, explained in greater detail elsewhere herein, with respect to macro level speed measurement from an external speed sensor or internal speed measurement (such as GPS) of the computer 47 or secondary device to establish energy spent on macro scale acceleration and/or deceleration.

Figure 4:
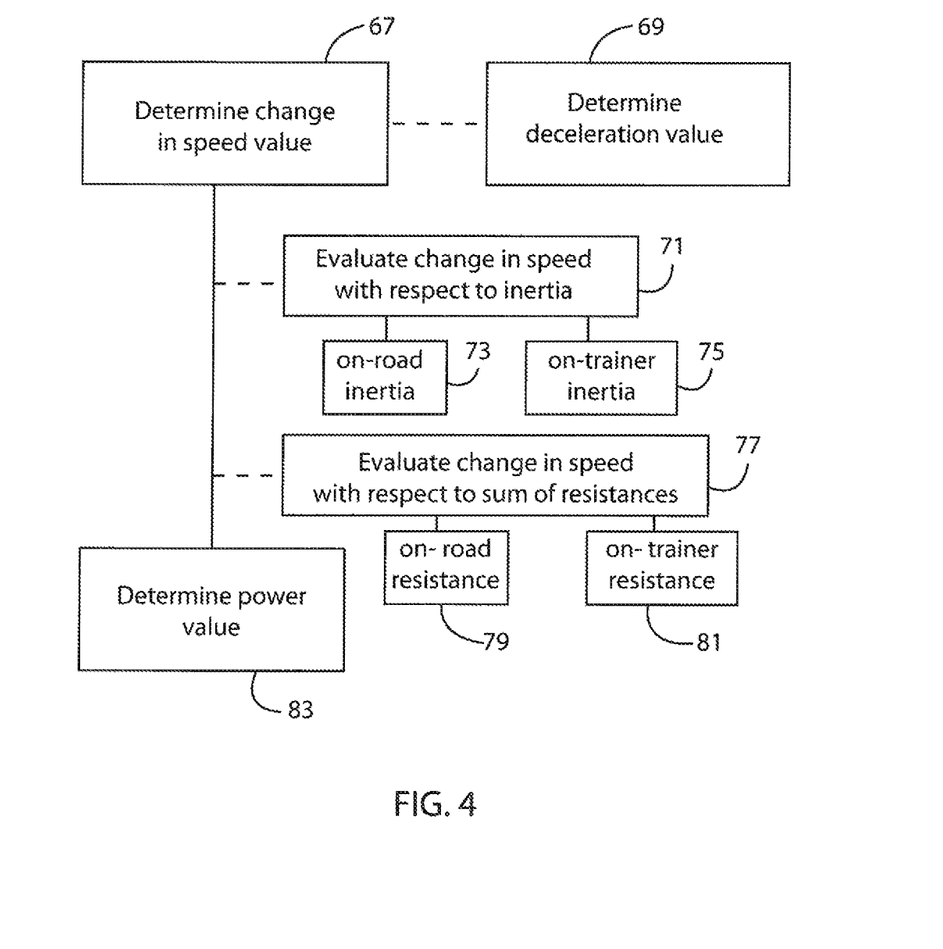
FIG. 4 is a flowchart schematically representing a method for determining power based on a speed-related value in accordance with the present invention.

Referring now to FIG. 4 and with further reference to FIGS. 1-3, in one embodiment, the processor 53 (FIG. 3) determines a power value based on a speed value(s) that is measured continuously at short intervals between measurements. The processor 53 (FIG. 3) may receive signals from the sensor 37 (FIGS. 1-2) and determine a change in speed value of a rotating component of the bicycle 7 or trainer 39 (FIGS. 1-2), as represented at block 67. This may include determining a deceleration value, as represented at block 69. The change in speed value, such as the deceleration value, may be evaluated with respect to inertia, as represented at block 71.

Referring now to FIG. 4 with further reference to FIG. 1, block 73 represents on-road inertia of one embodiment in which the bicycle 7 (FIG. 1) is ridden on the road. Such on-road inertia value may be a sum of system inertia in the bicycle 7 and the bicyclist, which may correspond to a total weight of the bicyclist and the bicycle 7, In another embodiment, and referring now to FIG. 4 with further reference to FIG. 2, the bicycle 7 is mounted to a trainer 39 (FIG. 2) so that the inertia corresponds to an on-trainer inertia value, as represented at block 75 (FIG. 4). Such on-trainer inertia value may be a sum of system inertia in rotating components of or cooperating with the trainer 39, which may include the roller 45 of the resistance unit 43, the bicycle rear wheel 17, the flywheel 46 of the resistance unit 43, and bearings and an axle (not labeled) of the resistance unit 43. In another embodiment, the change in speed value, such as the deceleration value, may be evaluated with respect to a sum of the resistances, as represented at block 77.

Referring again to FIG. 4 with further reference to FIG. 1, in one embodiment in which the bicycle 7 (FIG. 1) is used on-road, the on-road resistance value may be a sum of resistance components from acceleration, hills, rolling resistance, and aerodynamic drag, as represented at block 79 (FIG. 4). In one embodiment in which the bicycle 7 is used on-road, power related to macro scale accelerations and/or decelerations may be accounted for based on a macro scale-speed measurement, rather than the dead-spot deceleration measurement. In another embodiment, the power due to these macro scale accelerations/decelerations may account for less than about 5% of the power spent during a ride, so it may be ignored in such evaluation, although it is understood that it could be included which may allow for obtaining maximum accuracy.

Referring again to FIG. 4 with further reference to FIG. 2, in one embodiment in which the bicycle 7 is mounted to the trainer 39 (FIG. 2), the on-trainer resistance value may be a sum of resistance components from the brake components of the trainer 39, acceleration, frictional losses between the rear wheel 17 and roller 45 of the resistance unit 43, and frictional losses between engaging bearings and the axle (not labeled) of the resistance unit 43, as represented at block 81 (FIG. 4).

Referring now to FIG. 4 with further reference to FIG. 3, the processor 53 (FIG. 3) performs such evaluation(s) to determine a power value, as represented at block 83 (FIG. 4). Referring again to FIG. 3, the determined power value may be displayed through the screen 66 and/or stored on the memory 55 of the computer 47 for later viewing through the computer 47 or other suitable device in communication with the computer 47.

Figure 5:
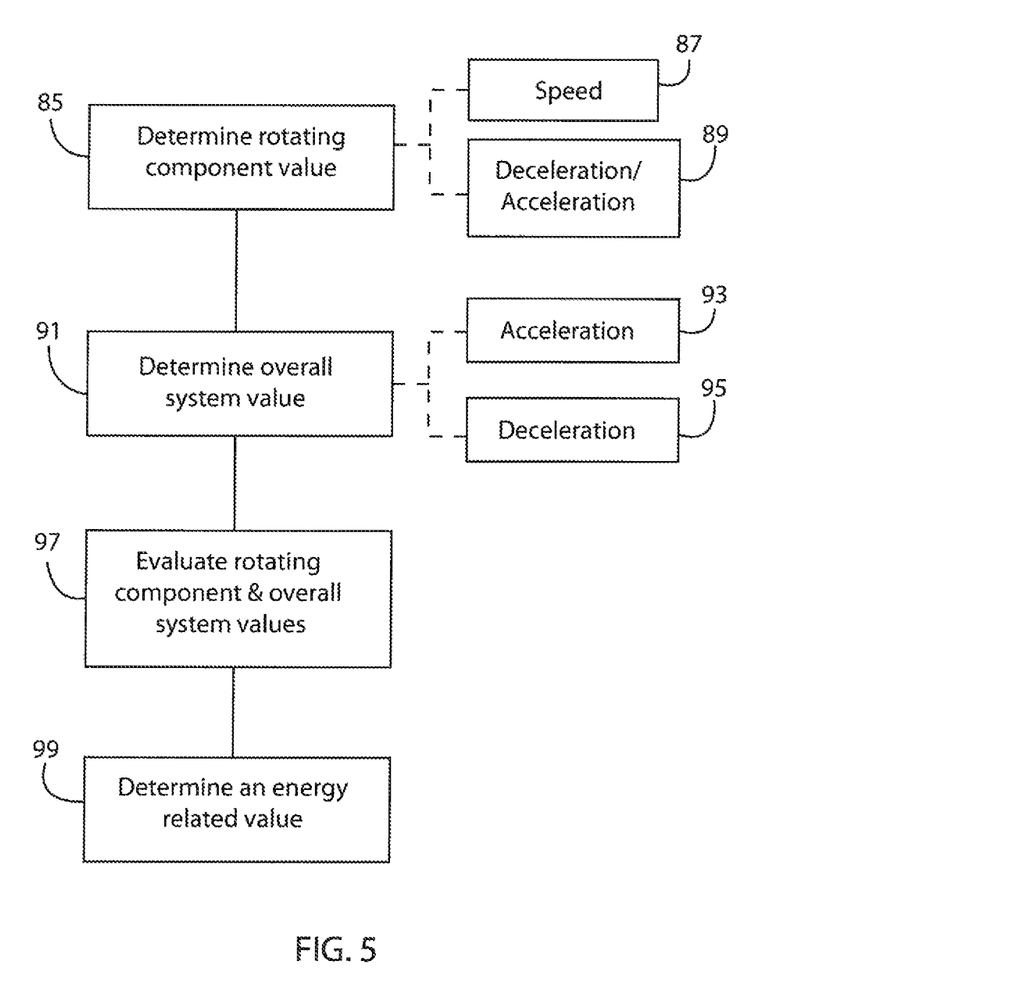
FIG. 5 is a flowchart schematically representing a variant of the method of FIG. 4.

Referring now to FIG. 5 with further reference to FIGS. 1-3, in one embodiment, the processor 53 (FIG. 3) determines a rotating component value corresponding to a performance characteristic of a rotating component of the bicycle 7 (FIG. 1) and/or resistance unit 43 (FIG. 2), as represented at block 85 (FIG. 5). Referring to FIG. 5, this may include determining a speed value and/or a deceleration or acceleration value of the rotating component, as represented at blocks 87 and 89, respectively. As represented at block 91, an overall system value may be determined, which may include determining an acceleration or deceleration value of the bicycle 7 and bicyclist (FIG. 1), corresponding to blocks 93, 95, respectively. Block 97 represents evaluating the rotating component value(s) and the overall system value(s). As represented at block 99, an energy-related value may be determined. This may include determining a total energy gain or loss value. As described elsewhere herein and referring again to FIG. 3, such determined values may be displayed through or stored for later viewing on the computer 47 or other device.

Figure 6:
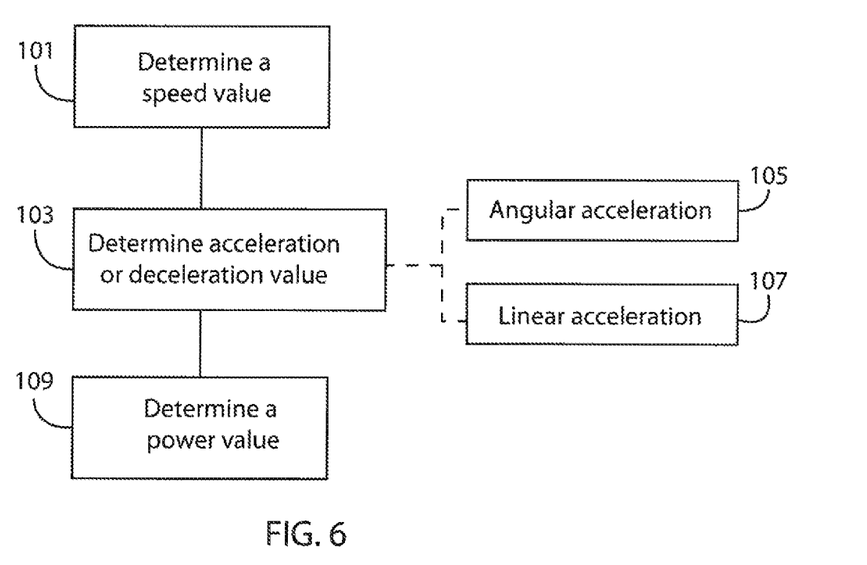
FIG. 6 is a flowchart schematically representing another variant of the method of FIG. 4.

Referring now to FIG. 6 with further reference to FIGS. 1-3, in one embodiment, the processor 53 (FIG. 3) determines a speed value which may correspond to an overall system speed of the bicycle 7 and bicyclist (FIG. 1) and/or a speed value of a rotating component of the bicycle 7 (FIG. 1) and/or resistance unit 43 (FIG. 2), as represented at block 101 (FIG. 6). Referring to FIG. 6, an acceleration and/or deceleration value is determined, as represented at block 103. This may be done by measuring angular acceleration or linear acceleration, as represented by blocks 105 and 107, respectively. A power value may be determined in light of the speed value and acceleration and/or deceleration values, as represented at block 109. This may include determining a maximum deceleration value during each pedal stroke based at least in part on the speed value and/or acceleration and/or deceleration values and determining the power value based on such maximum deceleration value, which may be displayed through or stored on the computer 47 (FIG. 3) or other device.

Figure 7:
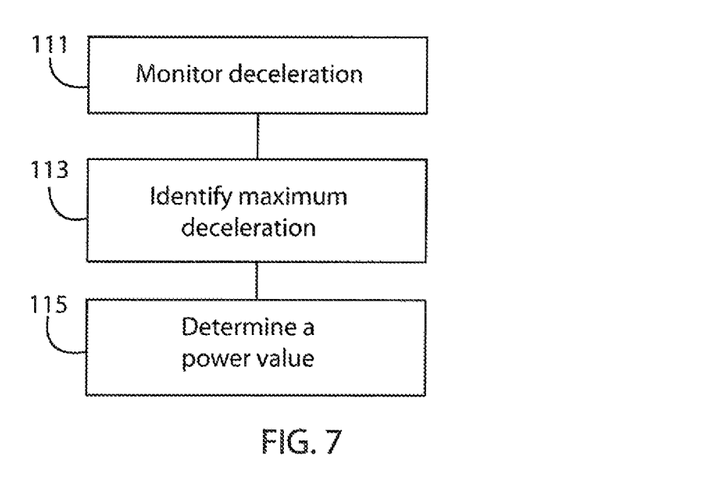
FIG. 7 is a flowchart schematically representing another variant of the method of FIG. 4.

Referring now to FIG. 7, in one embodiment, deceleration is measured or monitored, which may be done continuously, as represented at block 111. As represented at block 113, a maximum deceleration value is identified during a pedal stroke. As represented at block 115, a power value may be determined based on the maximum deceleration value, which may be displayed through or stored on the computer 47 (FIG. 3) or other device. This may correspond to a characteristic of a slope of a portion of a graphed function of a pedal stroke(s) performance that corresponds to a dead spot in the pedal stroke(s), as explained in greater detail elsewhere herein.

Figure 8:
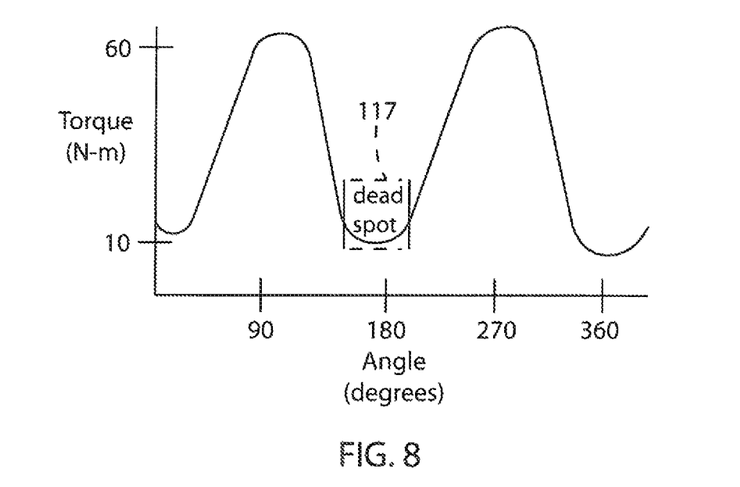
FIG. 8 is a graph showing pedaling torque in Newton/Meters as a function of crank arm angle in degrees while pedaling at 90 rotations per minute (RPM) and expending 250 watts.
Figure 9:
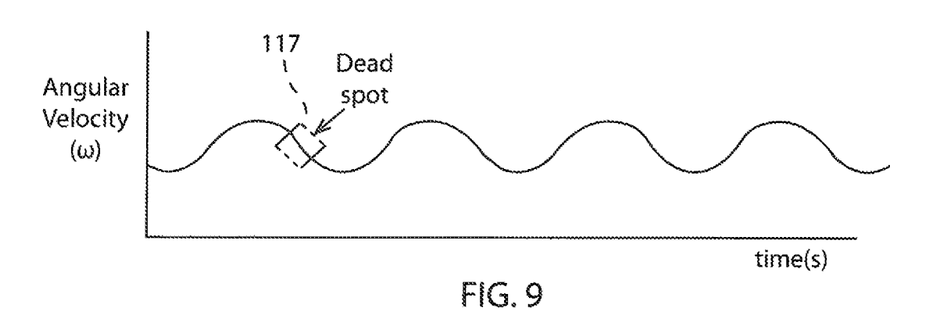
FIG. 9 is a graph showing angular velocity in radians or degrees per second as a function of time in seconds with constant resistance.

Referring now to FIGS. 8 and 9, in one embodiment, the change in speed or deceleration values may correspond to periods of time in which very little or no power is inputted by the bicyclist to the bicycle 7. Such period(s) of time may occur during a dead spot 117 in a pedal stroke in which a minimum power is delivered by the bicyclist to the bicycle 7 during the pedal stroke. During the time period of the dead spot 117, energy lost translates to a total resistance against which the bicyclist is pedaling, which corresponds to the power the bicyclist must deliver to maintain current speed. Accordingly, by using evaluations such as those shown in FIGS. 4-7, the power value may be determined by evaluating deceleration of the system, which may be predominantly a result of system kinetic energy and resistance applied. The dead spot 117 may be identified by the processor 53 (FIG. 3) by finding several data points in a row where a change in angular velocity remains substantially constant and is negative, The most negative slope may correspond to the least applied power segment, ideally an applied power of zero. Based on such negative slope (FIG. 9) and average angular velocity, a power value can be determined by the processor 53 (FIG. 3) since, when the power being applied to the system is zero, a calculation of energy being dissipated may be represented as a function of a change in kinetic energy from ½ (mass) multiplied by velocity$^2$.

Various alternatives and embodiments are contemplated as being within the scope of the following claims particularly pointing out and distinctly claiming the subject matter regarded as the invention.

We claim:

1. A system for determining power of a bicyclist while riding a bicycle, comprising:
   a bicycle that includes a frame and a rotating component rotatably coupled to the frame;
   a sensing device arranged for detecting a speed-related value of the bicycle;
   a processor that communicates with the sensing device and is configured to determine a change in the speed-related value and to determine a power value based on the change in the speed-related value;
   wherein the sensing device is arranged for sensing a rotational speed of the rotating component and the speed-related value corresponds to the sensed rotational speed of the rotating component, and wherein the change in the speed-related value corresponds to a change in the rotational speed of the rotating component;
   wherein the sensing device is an angular accelerometer for measuring at least one of an angular accelerometer of the rotating component and a deceleration of the rotating component; and
   wherein the processor determines the change in the speed-related value corresponding to an occurrence of a dead spot in a pedal stroke in which a minimum power is applied by a bicyclist to the bicycle during the pedal stroke.

2. The system of claim 1, wherein the processor determines an energy-lost value and evaluates the change in the speed-related value with respect to the energy-lost value to determine the power value.

3. The system of claim 2, wherein the energy-lost value corresponds to a deceleration during the dead spot in the pedal stroke.

4. The system of claim 2, wherein the energy-lost value is determined based at least in part on an inertia value of the system.

5. The system of claim 4, wherein the inertia value is a sum inertia value define by summing multiple inertia component values of the system.

6. The system of claim 5, wherein the inertia component values of the system include at least one of an inertia value of the bicycle, an inertia value of the bicyclist, and respective inertia values of multiple rotating components of the system.

7. A system for determining power of a bicyclist while riding a bicycle, comprising:
   a bicycle that includes a frame and a rotating component rotatably coupled to the frame;
   a sensing device arranged for detecting a speed-related value of the bicycle; and
   a processor that communicates with the sensing device and is configured to determine a change in the speed-related value and to determine a power value based on the change in the speed-related value; and
   wherein the sensing device is arranged at least one of a front wheel, a rear wheel, forks, and a crank assembly of the bicycle for determining the change in the speed-related value of the at least one of the front wheel, the rear wheel, the forks, and the crank assembly of the bicycle.

8. A system for determining power of a bicyclist while riding a bicycle, comprising:
   a bicycle that includes a frame and a rotating component rotatably coupled to the frame;
   a sensing device arranged for detecting a speed-related value of the bicycle;
   a processor that communicates with the sensing device and is configured to determine a change in the speed-related value and to determine a power value based on the change in the speed-related value;
   wherein the sensing device is a linear accelerometer for measuring an acceleration and/or deceleration of the bicycle and wherein the speed-related value corresponds to acceleration and/or deceleration of the bicycle; and
   further comprising a speed sensor arranged for sensing the speed of the bicycle and wherein the processor communicates with the linear accelerometer and the speed sensor and determines a maximum deceleration value that corresponds to a dead spot of a pedal stroke in which a minimum power is applied by a bicyclist to the bicycle during the pedal stroke and determines the power value based on the speed and deceleration values at the dead spot.

9. A method for determining power of a bicyclist while riding a bicycle, comprising:
   determining with a processor communicating with a sensing device a change in a speed-relay value corresponding to a chance in at least one of a linear speed of a bicycle, a rotational speed of a rotating component of the bicycle, and a rotational speed a rotating component of a resistance unit for resisting pedaling effort of a bicyclist pedaling the bicycle;
   determining a power value based at least in part on the determined chance in the speed-related value; and
   further comprising determining with the processor a dead spot occurrence in which a minimum power is applied by the bicyclist to the bicycle during a pedal stroke and determining the change in the speed-related value for the dead spot occurrence and wherein the power value is determined at least in part by evaluating the change in speed-related value for the dead spot occurrence and an inertia value of the bicycle.

* * * * *

UNITED STATES PATENT AND TRADEMARK OFFICE
CERTIFICATE OF CORRECTION

PATENT NO. : 9,341,526 B2  
APPLICATION NO. : 14/227128  
DATED : May 17, 2016  
INVENTOR(S) : Benjamin R. Bass et al.

Page 1 of 1

It is certified that error appears in the above-identified patent and that said Letters Patent is hereby corrected as shown below:

IN THE CLAIMS

CLAIM 1, column 9, line 19, delete "accelerometer" and substitute therefor -- acceleration --;

CLAIM 7, column 10, line 3, after "at" insert -- at --;

CLAIM 9, column 10, line 35, delete "speed-relay" and substitute therefor -- speed-related --;

CLAIM 9, column 16, line 39, after "resisting" insert -- a --.

Signed and Sealed this  
Ninth Day of August, 2016

Michelle K. Lee  
*Director of the United States Patent and Trademark Office*